(No Model.)
D. DOBBINS & R. McKENNEY.
PNEUMATIC TIRE.
No. 504,468. Patented Sept. 5, 1893.
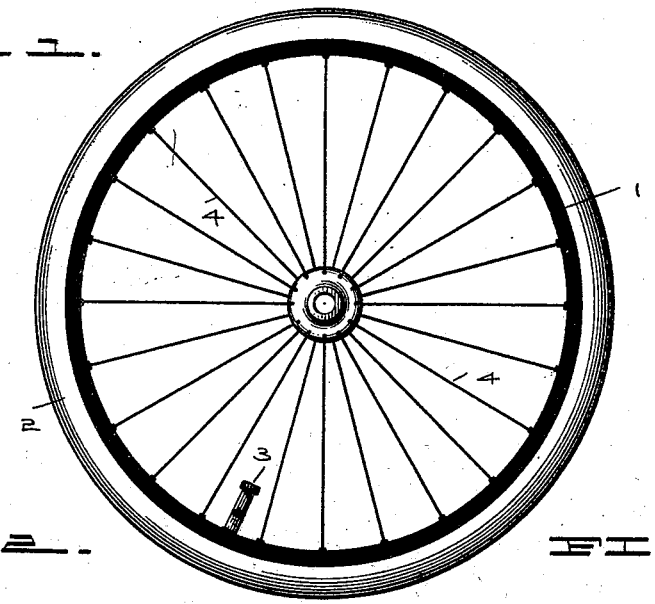
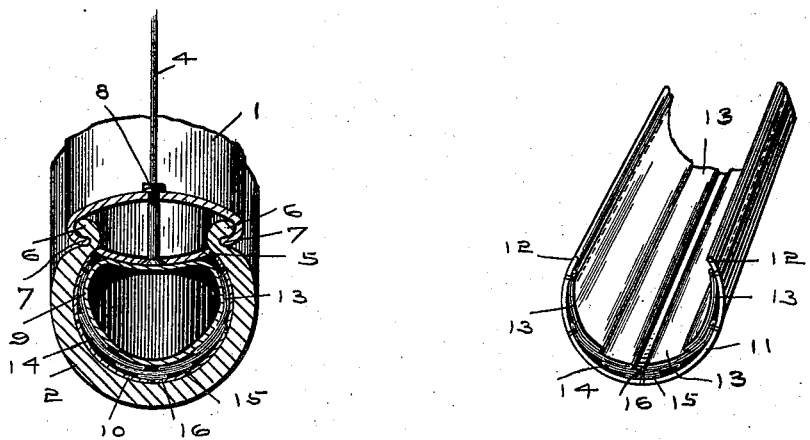
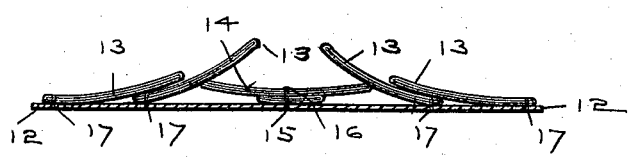
Witnesses
H. E. Nealy.
E. B. Griffith.
Douglas Dobbins  Inventors
and Richard McKenney.
By their Attorney
V. H. Lockwood

UNITED STATES PATENT OFFICE.

DOUGLAS DOBBINS AND RICHARD McKENNEY, OF FRANKLIN, INDIANA, ASSIGNORS OF TWO-THIRDS TO JOHN C. McNUTT, THOMAS J. COYLE, AND WILLIAM B. JENNINGS, OF SAME PLACE, AND THOMAS TAGGART, OF INDIANAPOLIS, INDIANA.

PNEUMATIC TIRE.

SPECIFICATION forming part of Letters Patent No. 504,468, dated September 5, 1893.

Application filed December 31, 1892. Serial No. 456,949. (No model.)

*To all whom it may concern:*

Be it known that we, DOUGLAS DOBBINS and RICHARD MCKENNEY, of Franklin, county of Johnson, State of Indiana, have invented certain new and useful Improvements in Pneumatic Tires; and we do hereby declare that the following is a full, clear, and exact description thereof, reference being had to the accompanying drawings, in which like figures refer to like parts.

Our invention relates to pneumatic tires, and especially to means of protecting the usual inner inflatable rubber tube from being punctured, without in the least decreasing its resiliency.

In the drawings, Figure 1 is a side elevation of a wheel provided with our pneumatic tire. Fig. 2 is a cross sectional view in perspective of the tire and rim. Fig. 3 is a perspective view of a detached section of the protecting strip curved in its normal position in the tire, and Fig. 4 shows a cross section of such strip flattened.

1 is the rim, 2 the outer covering of the tire made preferably of rubber, and 3 a closed tube through which the tire is inflated by the usual means.

4 is a spoke passing loosely through the rim 1 and secured at its outer end to a brace or clamp plate 5. The outer covering 2 of the tire has beaded or enlarged edges 6 which are caught between the edges of the brace plate 5 and the inturned edges 7 of the rim 1, and held or clamped by tightening the nut 8 on the spoke 4.

9 is an inflatable tube, made preferably of rubber, within the outer covering of the tire and between it and the brace plate 5.

Between the outer covering 2 of the tire and the inflatable tube 9 is a protecting strip 10. This strip consists of an elastic base piece 11, made preferably of rubber, whose width is nearly that of the inside of the outer covering 2 when flattened. The elastic base piece is glued or otherwise secured to such outer covering near its edges 12, leaving the middle portion of it free. To this elastic base strip 11 are secured several longitudinal strips 13, made of folds of finely and tightly woven silk or other impenetrable material. The number of folds is not fixed, but we employ preferably about eight folds of silk in each strip. The central strip is in the average bicycle tire preferably an inch and a quarter in width, and just beneath it is another strip 15 about a half inch in width. Both of these strips of silk are preferably sewed at 16 to the central part of the elastic base strip 11. On each side of the central strip are parallel strips which are sewed at their outer edges 17 to the base strip 11. The free edge of each strip laps over the edge of the adjoining strip, as shown in Fig. 3. The lap is preferably sufficient to provide at least two layers of strips to resist a penetrating object at any point, except possibly at the side of the tire. The inflatable tube presses strongly outward against the strips of silk and keeps them compact.

The advantages of our protecting strip arise from the peculiar manner of its construction, and also from the use of finely woven silk or similar material. The finely woven silk is flexible, and at the same time is a perfect protection against a pointed object, as it is impossible to pierce it constructed in folds when in the wheel and surrounded by the outer covering and surrounding the inflatable tube.

To prevent any sharp object from having the advantage of a straight push against the silk, the latter is made in overlapping longitudinal layers attached to an elastic base which is free to stretch laterally. When the object contacts with a strip of silk, the latter not only resists, but, as the strip is pushed, its free edge permits it to slip somewhat out of the way, whereby the object, if it be loose, will be turned aside out of range with the inflated tube. If such sharp object be rigidly attached to something, when it contacts with the silk strip the latter, being attached to an elastic base strip and bearing against the rounded surface of the inflatable tube, will be pushed upward somewhat, and will in turn shift the inflatable tube slightly aside out of danger. If such rigid object attack the wheel in the exact center, its entrance is retarded by three super-imposed strips, the wide central one 14, the narrow one 15 beneath, and the overlapping ones 13 above. If the pressure becomes in such case great, the central part of the protecting strip will shift laterally and throw the inflatable tube to one side. The overlapping of the strips will not permit any object to escape contact with less than two silk strips, and when a strip slips laterally, it will carry the sharp pointed object away from the inflatable tube. The above material and construction afford a perfect protection to the inflatable tube, yet they do not in the least decrease the resiliency of it. The elastic base strip attached only at its outer edges and the longitudinal strips sewed or otherwise fastened to such elastic strip at only one place, allows all parts to have great elasticity and freedom of movement. Thus we overcome a great defect in protecting armor heretofore used, which was stiff or hard, and bound the inflatable tube, making it quite rigid and unyielding, and materially decreasing its resiliency, which is the *raison d'etre* of pneumatic tires.

The wheel, wheel rim, outer covering of the tire, and the inflatable tube herein shown and described are those of a well known construction, and we do not claim them as our invention.

Our protecting strip can be used in any ordinary form of pneumatic tire, and we do not wish to limit ourselves to any one form.

What we claim as our invention, and desire to secure by Letters Patent, is the following:

1. In a pneumatic tire, a protecting strip consisting of a number of narrow longitudinal strips of impenetrable material with their edges overlapping.

2. In a pneumatic tire, a protecting strip consisting of an elastic base and a number of narrow longitudinal strips of impenetrable material secured to such base with their edges overlapping.

3. In a pneumatic tire, a protecting strip consisting of an elastic base and a number of narrow longitudinal strips of impenetrable material, each secured to such base at one longitudinal line, and with their edges overlapping toward the center of such base.

4. In a pneumatic tire, a protecting strip consisting of an elastic base strip, and a number of narrow longitudinal strips of folds of finely woven silk, each sewed or otherwise fastened by one longitudinal seam to such base, and with their edges overlapping toward the center of such base.

5. In a pneumatic tire, a protecting strip consisting of an elastic base piece, and a number of narrow longitudinal strips of folds of finely woven silk, one central strip centrally sewed or otherwise fastened to such base piece, and parallel strips on each side of such central strip, each sewed or otherwise fastened near its outer edge to the base piece, and the inner edge overlapping the adjoining strip.

6. In a pneumatic tire, a protecting strip consisting of an elastic base piece, and a number of narrow longitudinal strips of flexible impenetrable material, one central strip wider than the other strips, and beneath it a narrow strip, both centrally attached to the base piece and parallel strip on each side of such central strip, each attached near its outer edge to the base piece and the inner edge overlapping the adjoining strip.

7. In a pneumatic tire, a protecting strip consisting of an elastic base piece with longitudinal strips of flexible impenetrable material attached to such base piece, in combination with a flexible outer tire covering, such base piece attached at its edges to such outer covering.

8. A pneumatic tire consisting of an outer flexible covering suitably attached to the wheel rim, an inner inflatable tube, and a longitudinal elastic protecting strip between such outer covering and inflatable tube, such strip attached at its edges to such outer covering.

9. A pneumatic tire consisting of an outer flexible covering suitably attached to the wheel rim, an inner inflatable tube, and an elastic protecting strip between such outer covering and inflatable tube, attached at its edges to such outer covering and having a series of narrow longitudinal strips of flexible impenetrable material attached to it and overlapping each other toward the center of the protecting strip, the overlapping edges of such narrow strips being free.

In witness whereof we have hereunto set our hands this 15th day of December, 1892.

DOUGLAS DOBBINS.
RICHARD McKENNEY.

Witnesses:
H. D. NEALY,
E. B. GRIFFITH.